May 28, 1946. F. J. SIGMUND ET AL 2,400,891
WINDING SUPPORT MEANS FOR MAGNETIZABLE CORES
Filed July 26, 1943 2 Sheets-Sheet 1

INVENTOR.
Frank J. Sigmund
BY William S. Hlavin
Hoodling and Kiost
attys

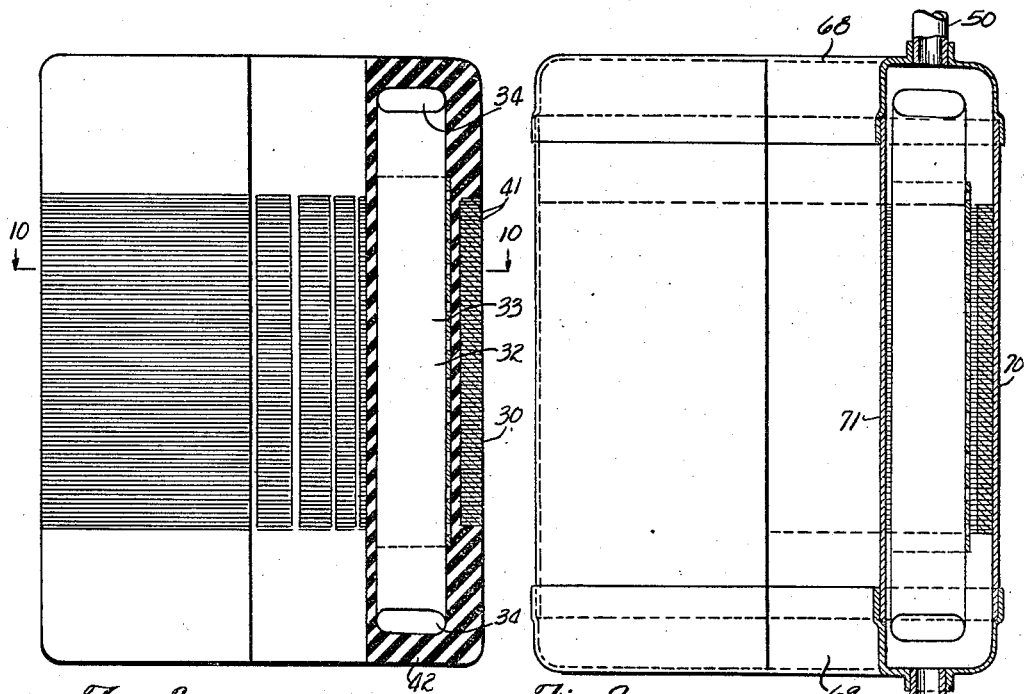
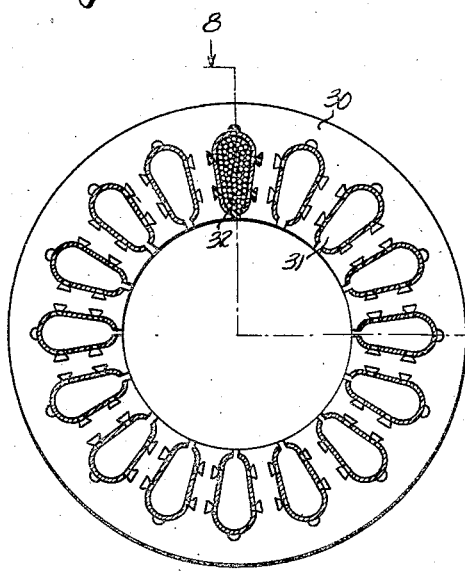
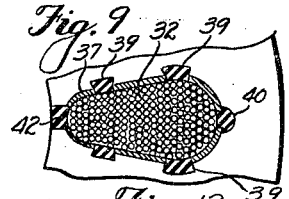
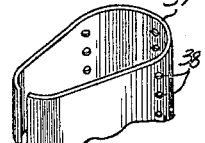
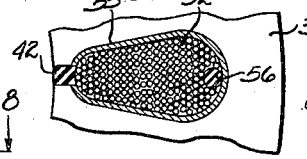
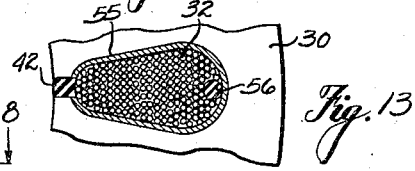
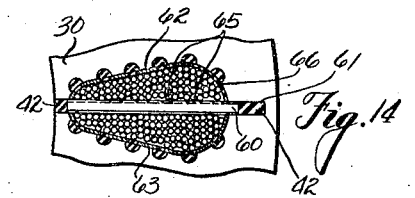

Patented May 28, 1946

2,400,891

UNITED STATES PATENT OFFICE 2,400,891

WINDING SUPPORT MEANS FOR MAGNETIZABLE CORES

Frank J. Sigmund and William S. Hlavin, Cleveland, Ohio, assignors, by mesne assignments, to Sigmund Corporation, a corporation of Ohio Application July 26, 1943, Serial No. 496,137

3 Claims. (Cl. 171—206)

Our invention relates in general to winding elements for dynamo-electric machines and more particularly to plastic supported winding elements which may be operated at high speed and voltages and which will withstand a great deal of moisture and vibration without damage.

The term "plastic supported" refers to the fact that the winding elements are supported in the slots of the magnetizable core by the use of a plastic or any other suitable material which may be castable or injected about the winding elements or otherwise applied to the winding elements such as by dipping to render the winding elements in a solid support within the slots of the core, wherein the winding elements are water or moisture-proof, dust-proof, insulation-proof and vibration-proof.

An object of our invention is the provision of supporting the winding elements in the slots of a magnetizable core by employing a castable or ejectable or dipped insulating material about the windings in the slots.

Another object of our invention is the provision of employing a destroyable mold for casting the castable material about the windings in the slots of the core to mechanically support the windings in the core.

Another object of our invention is the provision of insuring that the castable or dipped insulating material completely surrounds the windings within the slots to make a good mechanical support for the windings.

Another object of our invention is the provision of pre-coating or pre-dipping the magnetizable core and the windings with a thin coating which reacts favorably with the castable material which is cast about the windings in the slots of the magnetizable core.

Another object of our invention is the provision of coating each of the laminations prior to their being stacked into the core with a thin layer of material which renders the stacked laminations completely water-tight.

In this application and throughout the claims, for the sake of brevity, the term "winding elements" will be used to designate both the stationary and the rotatable elements of the dynamo-electric machine. Also, the term "castable" includes plastic material which has been either poured or injected into the mold; that is, the term "castable" includes ejected material as well as cast or dipped material, or any other insulating material which under one condition is viscous and under another condition is hard and provides a good mechanical support for the windings.

Other objects and a fuller understanding of our invention may be had by referring to the accompanying description and claims, taken in conjunction with the drawings, in which:

Figure 8 illustrates a vertical side elevational view of a stator employing the features of our invention with one side thereof shown in section and cut along the line 8—8 of Figure 10;

Figure 9 is a view similar to Figure 8 but shows destroyable molds about the stator prior to being cast with the castable material;

Figure 10 is a cross-sectional view taken along the line 10—10 of Figure 8 which shows one of the slots being completely filled with the windings, the other slots being shown unfilled with the windings for simplicity;

Figure 11 shows a perspective and fragmentary view of the end of a sleeve employed in the slots of the stator to envelope the windings;

Figure 12 is an enlarged cross-sectional view of the windings in the slots of the stator;

Figure 13 is a view similar to Figure 12 and shows another modified form for insuring that the castable material may completely surround the windings in the slots; and Figure 14 is another view showing a still further modified arrangement for insuring that the castable material may flow completely about the windings in the slots.

Figure 1:
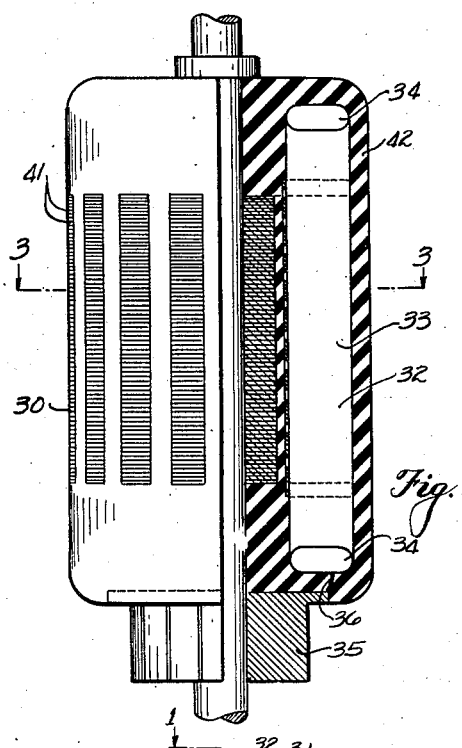
Figure 1 is a side elevational view of a rotor or armature of a dynamo-electric machine embodying the features of our invention with one side thereof shown in section, taken along the line 1—1 of Figure 3.
Figure 2:
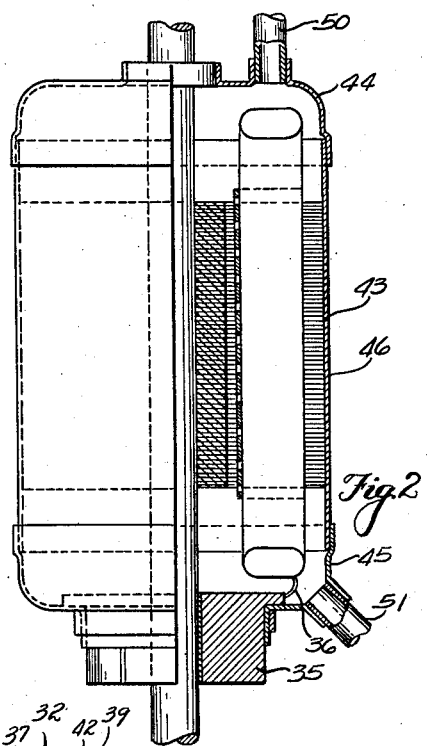
Figure 2 is a view similar to Figure 1 but shows the castable mold about the rotor or armature preparatory to casting the castable material about the windings of the core.
Figure 3:
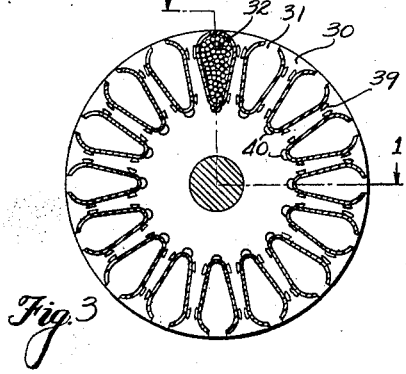
Figure 3 is a cross-sectional view taken along the line 3—3 of Figure 1, wherein one of the slots is shown filled with wires, the other slots being shown unfilled for the purpose of simplicity.
Figure 4:
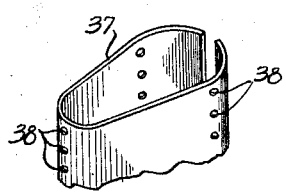
Figure 4 is a fragmentary end view of a sleeve employed in the slots of the core to envelope the windings.
Figure 5:
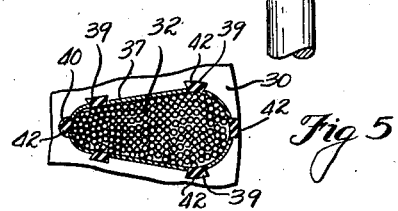
Figure 5 is an enlarged cross-sectional view of a slot showing the features of our invention.

With reference to Figure 1 which shows the completed rotor or armature embodying the features of our invention, the reference character 30 represents the laminated core having windings 32 provided in the slots 31 arranged peripherally around the core. The windings comprise coil sides 33 which are mounted in the slots and coil heads 34 which pass around the ends of the core. As diagrammatically illustrated, the lower end of the coil heads 34 are connected to the commutator bars 35 by means of the connection 36. Prior to inserting the windings in the slots of the core, we position a perforated sleeve 37 in each of the slots for enveloping the windings. In order to insure that the castable insulating material which is in the form of a liquid may completely surround the windings within the slots, we provide longitudinal side grooves 39 and a bottom groove 40 along the inside wall of each of the slots. The grooves extend from one end of the laminated core to the other. As illustrated in Figures 4 and 5, the perforated sleeve 37 is provided with registering openings 38 that communicate with the grooves in the side walls of the slots. By means of this construction, the castable material which is in the form of a liquid is allowed to flow longitudinally of the slots through the grooves 39 and 40 and then through the perforated openings 38 in the sleeves to completely surround the windings in the slots.

Prior to the casting or applying of the castable material about the windings and the core, the entire core with the windings provided in the slots is dipped into a bath of heated polystyrene which is maintained at a temperature in the neighborhood of 195° or 200° Fahrenheit. The bath of polystyrene is a very thin liquid and penetrates all of the interstices of the laminated core and completely forms a film or thin covering around each of the wires within the slots. Also, in constructing the laminated core we preferably take each of the laminations and apply a thin coating of polystyrene to the outer surface thereof, after which the laminations are assembled and stacked together under a heated temperature so that the stacked laminations are completely water-tight and impervious to any seepage of water or moisture between the laminations. The polystyrene film between the laminations may be indicated by the reference character 41 in Figure 1 and may be applied in a thin film to the outer surface of the laminations either by dipping the laminations into a heated bath of polystyrene or by spraying the polystyrene thereon under a heated temperature.

The insulating material in all the views of the drawings is indicated by the reference character 42. The materials suitable for insulation include the thermosetting plastics such as phenol-formaldehyde, urea-formaldehyde, and combinations or variations thereof; the thermoplastics such as polymers and co-polymers of vinyl chloride, vinyl acetate, vinylidene chloride, methyl methacrylate, and combinations or variations thereof as well as synthetic or natural waxes, resin, rubbers and rubber-like materials or combinations, variations and modifications thereof. Fillers, plasticizers and other substances may be added to obtain desirable electrical, physical, chemical and mechanical properties. Solvents may be employed to facilitate the application of any of these materials.

The insulating material and the polystyrene film act favorably toward each other so that there is a good bond between the insulating material and the polystyrene which is completely surrounding the inside surface of the slots and the windings. We further find that the polystyrene when applied to the outer surface of the windings, which may have an enamel coating, does not destroy the enamel coating upon the wires. In casting the castable insulating material about the windings in the slots and the coil heads, we mount the complete core with the windings therein in a mold indicated generally by the reference character 43 which comprises a top portion 44, a bottom portion 45, and a central cylindrical portion 46. The mold is arranged to be made out of destroyable material so that after the castable insulating material has set the mold may be removed from the completed core by stripping or breaking it therefrom. The mold may be made of very thin material such, for example, as tin, lead or glass, or paper or any other treated material which may be destroyed upon removing same from the core. The connection between the top and bottom portions of the mold with the cylindrical portion 46 may be sealed so that the liquid castable insulating material will not flow therethrough. The liquid castable insulating material may be inserted into the mold by heating the castable insulating material under pressure through the tube 51 until the castable insulating material completely fills the inside of the mold. A vacuum may be applied to the tube 50 to remove all possible traces of air or other gases. The vacuum may remain only for a short period of time sufficient to remove the gases and air, after which the vacuum may be removed. The bottom of the mold may be clamped tightly about the commutator 35 and the top of the mold may be clamped tightly about a collar or shoulder upon the shaft of the core. As the castable insulating material flows upwardly within the mold, it flows through the grooves 39 and 40 along the inside wall of the slots and out through the openings 38 of the sleeve into the space about the wires to completely surround same. When finally set the liquid insulating material becomes hard and provides a good mechanical support for the windings in the slots. Any suitable means may be provided for heating the liquid insulating material in the mold. In order to reduce the amount of time required to set the liquid insulating material, the core may be pre-heated to approximately the correct temperature before the liquid insulating material is fed into the mold. In the completed rotor or armature the coil heads upon each end of the rotating element as well as the coils within the slots are mechanically supported by the castable insulating material to make a good strong mechanical support for the windings which render them moisture-proof, dust-proof, insulation-proof and vibration-proof.

Figure 6:
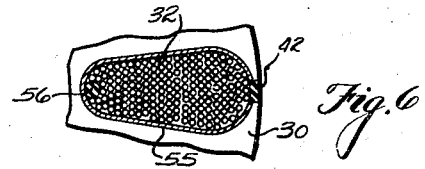
Figure 6 is a view similar to Figure 5, and shows a further modified arrangement for insuring that the castable material may flow to all of the spaces about the windings in the slots.

In Figure 6 we show another modified arrangement for insuring that the liquid insulating material may flow longitudinally of the slots to completely fill the spaces around the windings, in that we insert a dummy strip 55 longitudinally of the slots before inserting the wires into the slots. After the wires are completely packed or positioned in the slots, the dummy strip 55 is removed which provides a communicating passage from one end of the core to the other to allow the liquid insulating material to rise within the slots and thereafter flow to the spaces about the windings. The sleeve 55 in Figure 13 need not necessarily be provided with openings since the liquid insulating material flows upwardly through the slots through the space provided by the dummy strip 56 which is inside of the sleeve 55.

Figure 7:
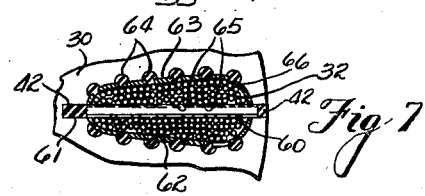
Figure 7 is a further modified arrangement showing the manner of insuring that the castable material may flow completely about the windings in the slots.

In Figure 7 we show another arrangement of means to insure that the liquid insulating material may completely surround the windings. In this embodiment, we employ a corrugated partition 60 which is disposed vertically within each of the slots with one of the edges of the corrugated partition 60 fitting in a deep slot 61 at the bottom of the winding slot and with the other edge of the partition 60 fitting within the throat opening of the winding slot. The sleeve is provided in two halves 62 and 63 which keep the windings from contacting the edge of the slot walls. A plurality of longitudinal grooves 64 may be provided around the wall of the winding slots so that the liquid and castable insulating material may flow through the grooves 64 and registered opening 66 in the sleeve to completely surround the windings. During the insertion of the windings within the winding slots, the partition 60 is pushed rearwardly within the deep slot 61 so that the end of the partition which registers with the throat of the winding slot may permit sufficient room for the insertion of the winding. After all of the windings have been inserted into the winding slot, the corrugated partition 60 is moved to the right in Figure 7 until it engages the throat opening of the winding slot with the left-hand edge of the partition still engaging the side walls of the deep slot 61. The corrugated partition 60 may be provided with the corrugations running at right angles to the longitudinal dimensions of the winding slots. The side walls of the partition are provided with openings 65 so that as the liquid and castable insulating material flows through the corrugations of the partition, it may then flow through the opening 65 to the space about the windings within the winding slots. The shiftable partition 60 not only provides a good means for supplying the liquid and castable insulating material through the windings but also provides a means for locking the windings within the throat of the winding slots to prevent the winding from escaping out through the throat opening of the winding slots.

The Figures 8 to 14, inclusive, relate to the application of our invention to the stator of a dynamo-electric machine and the Figures 8 to 14 represent, respectively, the Figures 1 to 7 so far as corresponding views are concerned. In addition, corresponding parts of the armature or rotor on one hand and the stator on the other hand are designated by the same reference character. That is to say, the core for the stator is represented by the reference character 30 and the slot by the reference character 31 and the windings by the reference character 32 having coil sides 33 and coil heads 34. Furthermore, the same reference characters apply to corresponding parts regarding the sleeves, the grooves, and the partition for providing ready access of the flow of the liquid and castable insulating material to the windings within the slots. Accordingly, the description with reference to the rotor or armature on one hand apply equally well to the description of the Figures 8 to 14 which are directed to the construction of a stator. The mold for the stator is somewhat different from the mold from the armature or rotor and thus we have applied new reference characters to the mold in that the top of the mold is indicated by the reference character 68, the bottom by the reference character 69 and the outer central mold by the reference character 70, and the inner central mold by the reference character 71. The mold for the stator may be of the same material as that described with reference to the armature rotor and may be destroyable when the castable resin has been set. The inner central mold 71 fits closely within the central opening of the stator and the outer central mold fits closely around the peripheral dimension of the stator core. The liquid and castable insulating material flows upwardly through the mould which fills all of the grooves, channels and other spaces about the windings to give a good mechanical support to the windings when the castable insulating material is once hardened. A vacuum may be applied to the vacuum tube 51 during the early stages of the supplying of the liquid and castable resin so that all of the air or other gases may be extracted therefrom.

After the vacuum has been removed, the liquid castable insulating material may be maintained under a positive pressure to insure complete impregnation of all the spaces in and about the windings.

The sleeves 37 may be constructed of substantially the same insulating material as the insulating material 42 and thereby produce a perfect bond between the two.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

We claim as our invention:

1. In the construction of a winding element having a magnetizable core with a plurality of winding slots and windings in said slots, the improvement of mechanical support means to support the windings in the slots, said mechanical support means comprising, in combination, a sleeve for each of the slots to envelop the winding, said sleeves extending throughout the length of the slots and keeping the windings from contacting the sides of the slots, and a mass of insulating material in the slots and filling the spaces about the windings in said slots to mechanically support the windings, the side wall of the slots having longitudinal groove means to receive the insulating material and said sleeves having openings to provide communication for said insulating material between said groove means and the space within the sleeves about the windings.

2. In the construction of a winding element having a magnetizable core with a plurality of winding slots and windings in said slots, the improvement of mechanical support means to support the windings in the slots, said mechanical support means comprising, in combination, a corrugated and perforated partition positioned in each of said slots with the said corrugations extending at an angle to the longitudinal direction of said windings, said partition substantially dividing the slot in two halves with one edge of the partition near the bottom of the slot and the other edge near the throat of the slot, linear strips for the side walls of the slots, and a mass of insulating material free of air pockets and of the class including polymerized and copolymerized substances in the slots and filling the spaces about the windings in said slots to mechanically support the windings, said corrugated and perforated partitions having spaced oppositely extending portions and spaced retracted portions, said retracted portions and perforations serving as communication ducts and providing longitudinal communication for receiving and distributing said insulating material in said slots.

3. In the construction of a winding element having a magnetizable core with a plurality of winding slots and windings in said slots, the improvement of mechanical support means to support the windings in the slots, said mechanical support means comprising, in combination, a sleeve for each of the slots to envelop the winding, said sleeves extending throughout the length of the slots and keeping the windings from contacting the sides of the slots, and a mass of insulating material in the slots and filling the spaces about the windings in said slots to mechanically support the windings, the side wall of the slots having longitudinal groove means to receive the insulating material and distribute same throughout the said slots.

FRANK J. SIGMUND.
WILLIAM S. HLAVIN.